(12) United States Patent　　(10) Patent No.: US 12,648,525 B2
Sha　　(45) Date of Patent: Jun. 9, 2026

(54) HEDGE TRIMMER

(71) Applicant: Greenworks (Jiangsu) Co., Ltd.,
Changzhou (CN)

(72) Inventor: Duoduo Sha, Changzhou (CN)

(73) Assignee: Greenworks (Jiangsu) Co., Ltd.,
Changzhou (CN)

( * ) Notice: Subject to any disclaimer, the term of this
patent is extended or adjusted under 35
U.S.C. 154(b) by 379 days.

(21) Appl. No.: 18/328,759

(22) Filed: Jun. 4, 2023

(65) Prior Publication Data

US 2024/0397878 A1　Dec. 5, 2024

(30) Foreign Application Priority Data

Jun. 22, 2022　(CN) ......................... 202221578064.6

(51) Int. Cl.
| | |
|---|---|
| *A01G 3/053* | (2006.01) |
| *A01G 3/04* | (2006.01) |
| *F16H 57/02* | (2012.01) |
| *F16H 57/025* | (2012.01) |

(52) U.S. Cl.
CPC ...... *A01G 3/053* (2013.01); *A01G 2003/0461*
(2013.01); *F16H 2057/02034* (2013.01); *F16H*
*2057/02073* (2013.01); *F16H 57/025* (2013.01)

(58) Field of Classification Search
CPC ........ A01G 3/04; A01G 3/047; A01G 3/0475;
A01G 3/053; A01G 2003/0461
See application file for complete search history.

(56) References Cited

U.S. PATENT DOCUMENTS

| | | | | |
|---|---|---|---|---|
| 3,597,842 | A * | 8/1971 | Greene ................. | A01G 3/053 |
| | | | | 30/198 |
| 4,197,764 | A * | 4/1980 | Auernhammer ....... | A01G 3/053 |
| | | | | 30/340 |
| 4,651,420 | A * | 3/1987 | Lonnecker ............ | A01G 3/053 |
| | | | | 30/296.1 |
| 4,932,126 | A * | 6/1990 | Pilatowicz ............ | A01G 3/053 |
| | | | | 30/277.4 |
| 5,031,395 | A * | 7/1991 | Ohkanda ............... | A01G 3/053 |
| | | | | 56/301 |
| RE34,358 | E * | 8/1993 | Miller ................... | A01G 3/053 |
| | | | | 30/296.1 |

(Continued)

FOREIGN PATENT DOCUMENTS

| | | | | | |
|---|---|---|---|---|---|
| AU | 2023203752 A1 * | 1/2024 | ............ | A01G 3/053 |
| CN | 106508444 A * | 3/2017 | ............ | A01G 3/053 |

(Continued)

*Primary Examiner* — Jason Daniel Prone

(57) ABSTRACT

A hedge trimmer includes a blade assembly, a power assembly, a battery pack, a connecting rod and a handle assembly. A first end of the connecting rod is fixedly connected with the power assembly and a second end of the connecting rod is connected with a battery pack cavity. The battery pack is mounted in the battery pack cavity, and the power assembly accounts for less than 46% of a weight of the hedge trimmer. The disclosure reduces a weight of the power assembly at a front end through placing the battery pack behind, and a hedge trimmer may not turn its head, which shortens an overall length requirement of the hedge trimmer. Therefore, a weight of the hedge trimmer is reduced, and a structure of the hedge trimmer is compact.

11 Claims, 3 Drawing Sheets

(56) References Cited

U.S. PATENT DOCUMENTS

| | | | | |
|---|---|---|---|---|
| 5,261,162 | A * | 11/1993 | Siegler | A01G 3/053 30/223 |
| 5,689,887 | A * | 11/1997 | Heywood | A01G 3/053 30/220 |
| 5,787,590 | A * | 8/1998 | D'Alessandro, Sr. | A01G 3/053 30/296.1 |
| 5,809,653 | A * | 9/1998 | Everts | A01G 3/053 30/208 |
| 5,987,753 | A * | 11/1999 | Nagashima | A01G 3/053 30/223 |
| 6,094,822 | A * | 8/2000 | Lange | A01G 3/053 30/216 |
| 6,170,159 | B1 * | 1/2001 | Kramer | A01G 3/053 30/216 |
| 6,263,579 | B1 * | 7/2001 | Nagashima | A01G 3/053 30/223 |
| 6,516,522 | B2 * | 2/2003 | Schneider | A01G 3/053 30/298 |
| 6,598,299 | B2 * | 7/2003 | Stark | A01G 3/053 30/220 |
| 7,752,760 | B2 * | 7/2010 | Baskar | A01G 3/053 30/340 |
| 8,186,066 | B2 * | 5/2012 | Doragrip | A01G 3/053 30/296.1 |
| 8,418,898 | B2 * | 4/2013 | Carlsson | A01G 3/053 30/296.1 |
| 9,041,320 | B2 * | 5/2015 | Untermann | A01G 3/053 318/34 |
| 9,314,916 | B2 * | 4/2016 | Tsuchiya | A01G 3/053 |
| 9,357,711 | B2 * | 6/2016 | Kato | A01G 3/053 |
| 10,375,896 | B2 * | 8/2019 | Sheffer | A01G 3/053 |
| 10,420,287 | B2 * | 9/2019 | Chou | A01G 3/053 |
| 10,537,983 | B2 * | 1/2020 | Dyer | A01G 3/053 |
| 10,953,533 | B2 * | 3/2021 | Menzel | A01G 3/053 |
| 11,272,671 | B2 * | 3/2022 | Shimizu | A01G 3/053 |
| 11,389,917 | B2 * | 7/2022 | Ito | A01G 3/053 |
| 11,432,467 | B2 * | 9/2022 | Shimizu | A01G 3/053 |
| 11,432,468 | B2 * | 9/2022 | Shimizu | A01G 3/053 |
| 11,485,003 | B2 * | 11/2022 | McCue | B25F 3/00 |
| 11,523,564 | B2 * | 12/2022 | Li | A01G 3/053 |
| 11,592,819 | B2 * | 2/2023 | Pjevach | A01D 34/78 |
| 11,648,656 | B2 * | 5/2023 | Shimizu | A01G 3/053 173/217 |
| 11,667,027 | B2 * | 6/2023 | Sugiura | B25F 5/02 173/170 |
| 11,723,314 | B2 * | 8/2023 | Ito | A01G 3/053 30/211 |
| 11,806,858 | B2 * | 11/2023 | Arnell | A01G 3/053 |
| 11,812,706 | B2 * | 11/2023 | Wang | A01G 3/053 |
| 11,844,317 | B2 * | 12/2023 | Suzuki | A01G 3/053 |
| 11,963,489 | B2 * | 4/2024 | Kitahara | A01G 3/053 |
| 12,233,525 | B2 * | 2/2025 | Luecke | A01G 3/053 |
| 12,268,132 | B2 * | 4/2025 | Shimizu | A01G 3/053 |
| 12,317,789 | B2 * | 6/2025 | Kodama | A01G 3/053 |
| 2010/0037469 | A1 * | 2/2010 | Chubb | A01G 3/053 30/216 |
| 2019/0203753 | A1 * | 7/2019 | Yao | A01G 3/053 |
| 2021/0015034 | A1 | 1/2021 | Ito et al. | |
| 2021/0146522 | A1 | 5/2021 | Luecke et al. | |
| 2022/0161411 | A1 | 5/2022 | Sugiura et al. | |
| 2022/0354061 | A1 * | 11/2022 | Sunazuka | A01G 3/053 |
| 2023/0049404 | A1 * | 2/2023 | You | A01G 3/053 |
| 2023/0284556 | A1 * | 9/2023 | Oishi | A01G 3/067 |
| 2024/0074359 | A1 * | 3/2024 | Li | A01G 3/053 |
| 2024/0088630 | A1 * | 3/2024 | Yu | A01G 3/053 |
| 2024/0155978 | A1 * | 5/2024 | Collins | A01G 3/053 |
| 2024/0308053 | A1 * | 9/2024 | McKernan | A01G 3/053 |
| 2024/0324515 | A1 * | 10/2024 | Kodama | A01G 3/053 |
| 2024/0418258 | A1 * | 12/2024 | Braun | B25F 5/00 |
| 2025/0000031 | A1 * | 1/2025 | Akita | A01G 3/053 |
| 2025/0098594 | A1 * | 3/2025 | Yamaoka | A01G 3/053 |

FOREIGN PATENT DOCUMENTS

| | | | | | |
|---|---|---|---|---|---|
| CN | 113196968 | A * | 8/2021 | | A01G 3/053 |
| CN | 116138028 | A * | 5/2023 | | A01G 3/053 |
| EP | 3235369 | A2 * | 10/2017 | | A01G 3/053 |
| EP | 4295669 | A1 * | 12/2023 | | A01G 3/053 |
| WO | WO-2016126547 | A1 * | 8/2016 | | A01G 3/053 |

* cited by examiner

HEDGE TRIMMER

TECHNICAL FIELD

The disclosure relates to a field of electric tools, in particular to a hedge trimmer.

BACKGROUND

There are many types of garden tools or electric tools for pruning branches on the market. Due to safety regulations, most of the current products are lithium battery rotor structure or gasoline straight head structure. Due to the bulky front end of the existing hedge trimmers, it takes a lot of effort for the user to lift them up during operation. However, some tools with a rear motor enable the hedge trimmer to be insufficient in power. The above factors will lead to a poor user experience when using it.

SUMMARY

The disclosure provides a hedge trimmer, which reduces a weight of a hedge trimmer by reducing a weight of the power assembly, and can also ensure its cutting performance and prolong a duration life.

The disclosure provides the hedge trimmer, the hedge trimmer includes a blade assembly, a power assembly, a battery pack, a connecting rod and a handle assembly. The blade assembly includes at least one blade. The power assembly drives the blade assembly to reciprocate. The battery pack supports power for the power assembly. A first end of the connecting rod is fixedly connected with the power assembly and a second end of the connecting rod is connected with a battery pack cavity. The battery pack is mounted in the battery pack cavity. The handle assembly is fixedly mounted on the connecting rod and close to the battery pack, which is used to control a start and stop of the power assembly. Wherein, the power assembly accounts for less than 46% of a weight of the hedge trimmer.

In an embodiment of the disclosure, the power assembly comprises a housing, a motor and a transmission assembly, the motor is mounted in the housing, the motor is an outer rotor motor, and the motor is connected in transmission with the transmission assembly.

In an embodiment of the disclosure, the transmission assembly includes a bull gear, a pinion and a connecting component, the pinion is fixed to an output shaft of the outer rotor motor, the bull gear meshes with the pinion, eccentric blocks are respectively arranged on positions deviated from a circle center on both sides of the bull gear, a first end of the connecting component is rotatably connected with the eccentric block, and a second end of the connecting component is rotatably connected with the blade assembly.

In an embodiment of the disclosure, a bottom of the housing is further provided with a gear box, the transmission assembly is arranged in the gear box, and the gear box is fixedly connected with the connecting rod.

In an embodiment of the disclosure, an end of the gear box connected with the connecting rod is provided with a connecting part, the connecting part is a hollow structure and the first end of the connecting rod extends into the connecting part, and a rotation and axial movement of the connecting rod are limited by a limiting bolt passing through the connecting part and the connecting rod in sequence.

In an embodiment of the disclosure, at least two opening grooves are symmetrically opened on the connecting part along an axial direction of the connecting part, both sides of each opening groove are provided with threaded connectors, the threaded connector is located at an end of the connecting part, a threaded hole is arranged on the threaded connector, and a fastening bolt is threaded into the threaded hole to lock the connecting part and the connecting rod.

In an embodiment of the disclosure, the battery pack cavity is arranged in a casing, and the second end of the connecting rod extends into the casing and is fixedly connected with the casing through a fixing component and a bolt.

In an embodiment of the disclosure, the battery pack comprises at least 23 battery cells.

In an embodiment of the disclosure, the connecting rod is a hollow structure, and a power cord is arranged inside the connecting rod.

In an embodiment of the disclosure, the connecting rod is further provided with a hanging holder, a distance from centers of gravity of the battery pack and the handle assembly to the hanging holder is from 440 mm to 500 mm, and a distance from centers of gravity of the power assembly and the blade assembly to the hanging holder is from 900 mm to 1000 mm.

The hedge trimmer of the disclosure reduces a weight of the front power assembly by placing the battery pack behind. At the same time, the power assembly is fixedly connected with the connecting rod through the connecting part and the hedge trimmer cannot be turned, which shortens an overall length requirement of the hedge trimmer, thereby reducing the weight of the hedge trimmer, saving more labor when lifting, and convenient for the operator to use. A structure of the hedge trimmer is compact, which ensures a cutting performance of the hedge trimmer and prolongs the duration life under a premise of reducing the weight of the hedge trimmer.

BRIEF DESCRIPTION OF THE DRAWINGS

In order to explain technical solutions of embodiments of the disclosure more clearly, the following will briefly introduce drawings used in a description of the embodiments. Obviously, the drawings in the following description are only some embodiments of the disclosure. For those of ordinary skill in the art, other drawings may be obtained based on these drawings without creative work.

PART NUMBER DESCRIPTION

Figure 1:
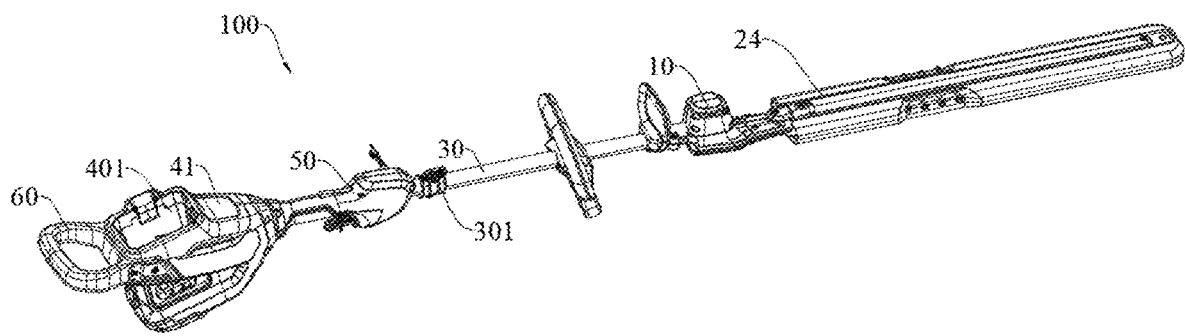
FIG. 1 is a structural schematic view of a hedge trimmer in an embodiment of the disclosure.
Figure 2:
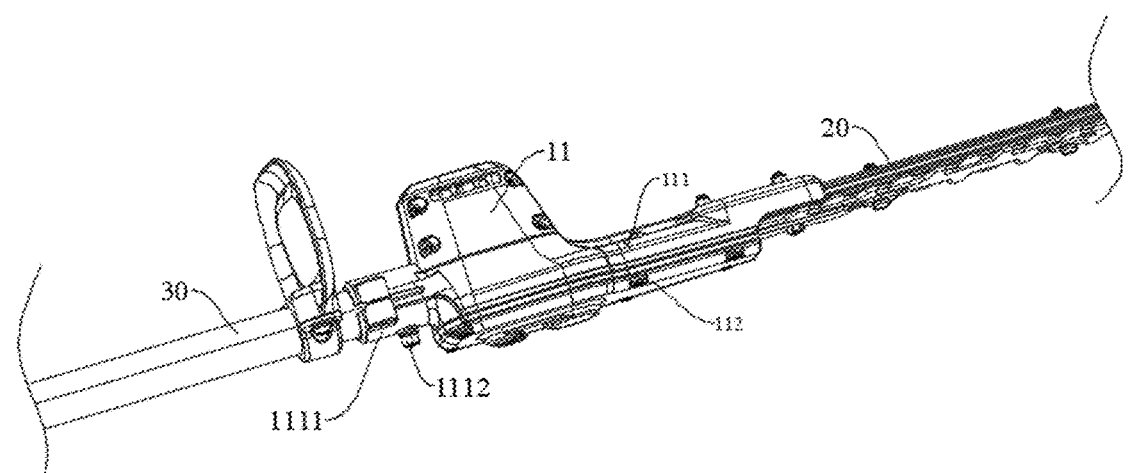
FIG. 2 is an assembly schematic view of a power assembly and a blade assembly in an embodiment of the disclosure.
Figure 3:
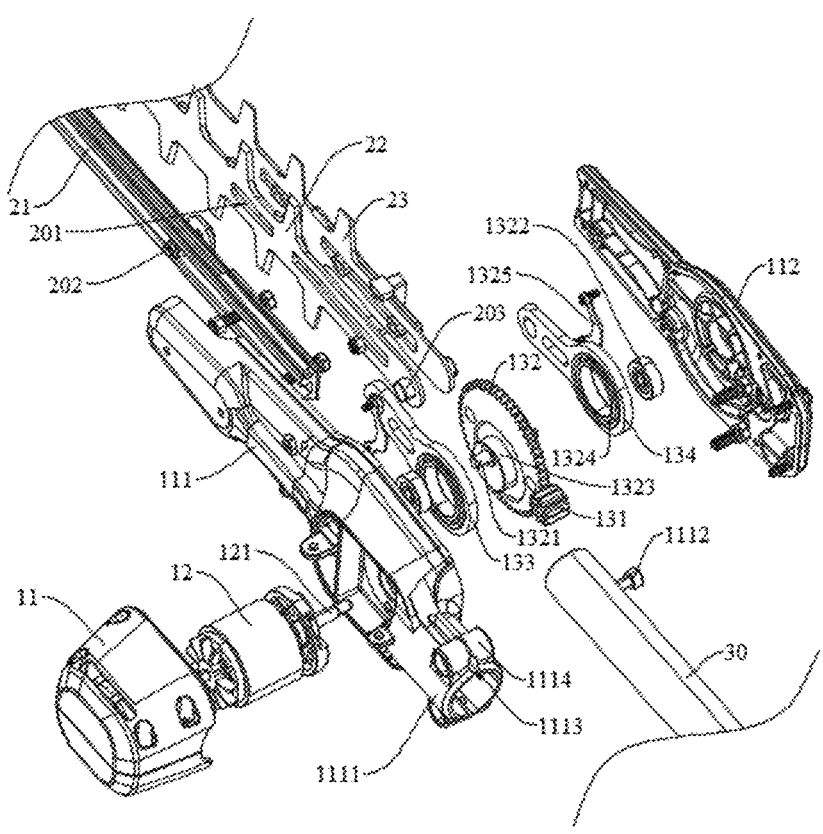
FIG. 3 is an exploded schematic view of the power assembly in the hedge trimmer in an embodiment of the disclosure.
Figure 4:
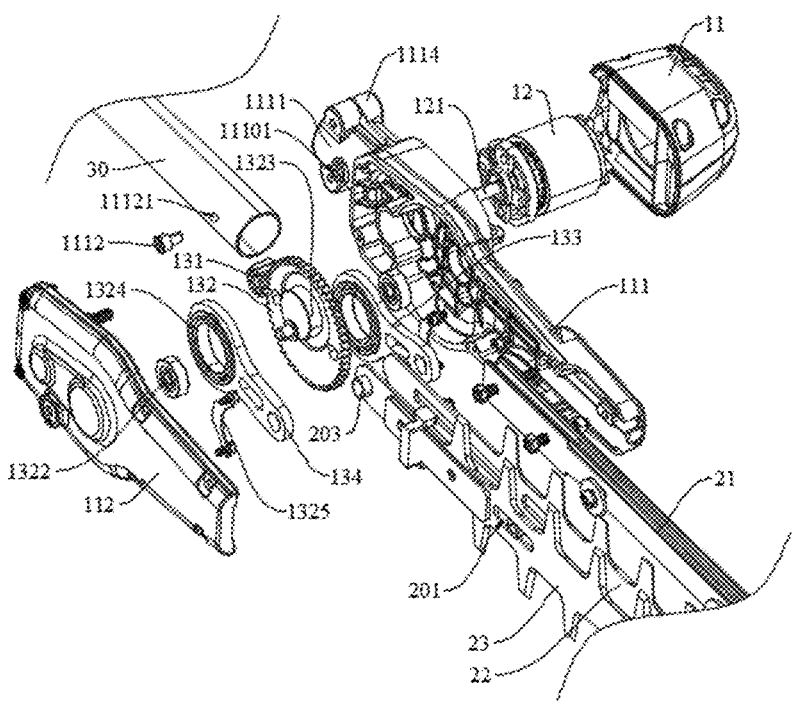
FIG. 4 is an exploded schematic view of the power assembly and the blade assembly in an embodiment of the disclosure.
Figure 5:
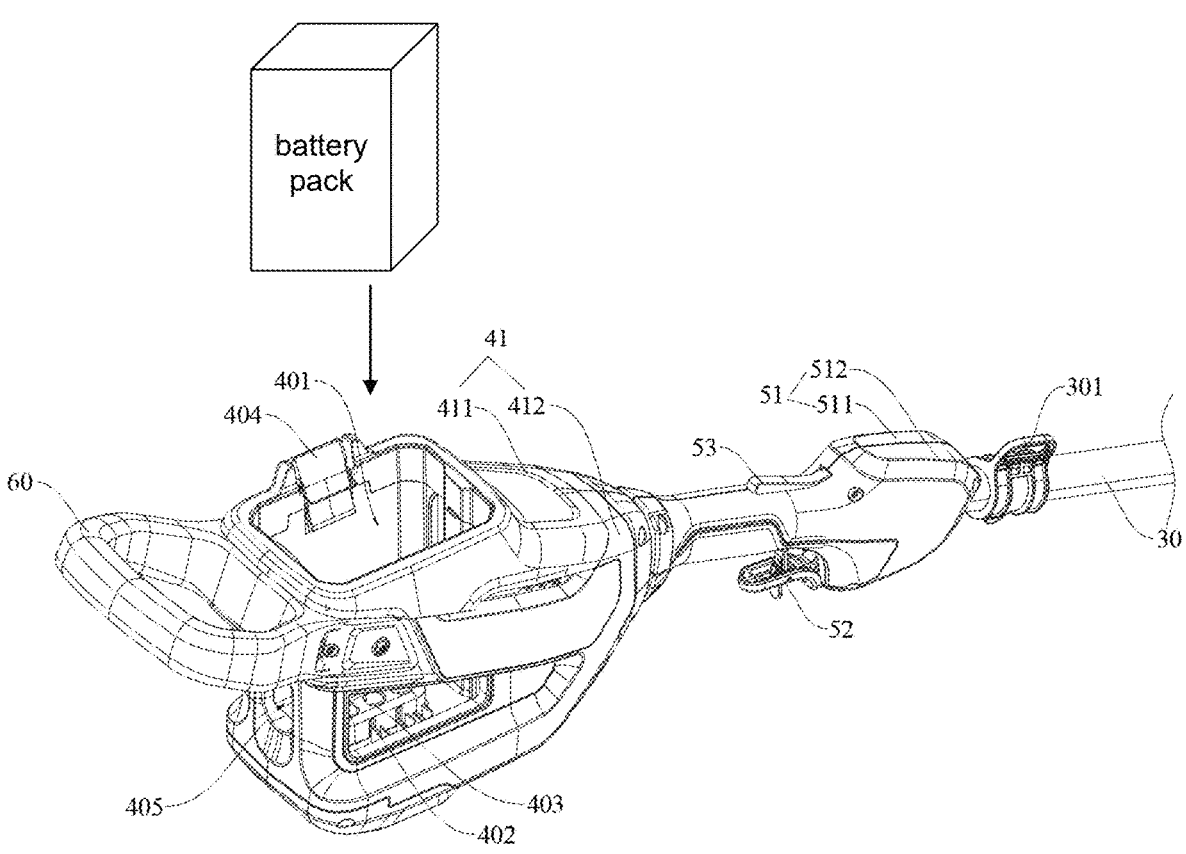
FIG. 5 is a schematic view of a battery pack, a battery pack cavity and a handle assembly in an embodiment of the disclosure.

100—hedge trimmer, 10—power assembly, 11—housing, 12—motor, 121—output shaft, 111—gear box, 112—gear box cover, 1111—connecting part, 1112—limiting bolt, 11121—first limiting hole, 11101—second limiting hole, 1113—opening groove, 1114—threaded connector, 131—pinion, 132—bull gear, 133—first connecting component, 134—second connecting component, 1321—rotation shaft, 1322—first bearing, 1323—eccentric block, 1324—second bearing, 1325—limiting component, 20—blade assembly, 21—blade holder, 22—first blade, 23—second blade, 24—blade assembly protector, 201—sliding groove, 202—bolt, 203—protrusion block, 30—connecting rod, 301—hanging holder, 302—fixing component, 41—casing, 411—first casing, 412—second casing, 401—battery pack cavity, 402—inserting piece, 403—battery pack elastic structure, 404—battery pack releasing button, 405—hollow structure, 50—handle assembly, 51—handle housing, 52—switch trigger, 53—anti-self-locking component, 511—first handle housing, 512—second handle housing, 60—auxiliary handle, 70—power cord.

DETAILED DESCRIPTION

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

It should be noted that drawings provided in the embodiments are only illustrative of a basic idea of the disclosure. The drawings only show assemblies related to the disclosure instead of drawing according to the number, shape and size of the assemblies in actual implementation. In actual implementation, the type, quantity and ratio of each assembly may be changed at will, and a layout of the assemblies may also be more complicated.

The disclosure provides a hedge trimmer to improve a problem that the conventional structure leads to poor experience when customers use it. Please refer to FIG. 1 through FIG. 5. The hedge trimmer 100 includes a power assembly 10, a blade assembly 20, a connecting rod 30, a battery pack and a handle assembly 50. Specifically, a first end of the connecting rod 30 is connected with the power assembly 10, and a second end of the connecting rod 30 is connected with a battery pack cavity 401. The battery pack is mounted in the battery pack cavity 401, and the battery pack is electrically connected with the power assembly 10 through a power cord 70 to supply power for the power assembly 10. The blade assembly 20 is mounted on a front side of the power assembly 10, and the blade assembly 20 is driven by the power assembly 10 to work. The handle assembly 50 is mounted on the connecting rod 30, located at one end close to the battery pack cavity 401 and used to control a start and stop of the hedge trimmer 100. In this embodiment, a weight of the hedge trimmer 100 is 4.2 kg, a weight of the power assembly 10 is 1.92 kg, and a weight ratio of the power assembly 10 in the hedge trimmer is less than 46%. The front power assembly 10 and the rear battery pack are connected by the connecting rod 30, which reduces the weight of the front power assembly 10, reduces the weight of the hedge trimmer and places the center of gravity of the hedge trimmer behind and saves effort for the user.

Please refer to FIG. 1 through FIG. 4. In order to reduce a space size of a power head as much as possible, on a premise of satisfying cutting power, a size of each material and a size of space arrangement need to reduced, a current situation that the power head is large and heavy and inconvenient to use needs to be changed, a demand for lightness and convenience needs to be realized, so that the hedge trimmer is provided. In this embodiment, the power assembly 10 includes a housing 11, a motor 12 and a transmission assembly. The motor 12 is mounted in the housing 11, and the motor 12 is an outer rotor motor. A bottom of the housing 11 is further provided with a gear box 111, and the transmission assembly is arranged in the gear box 111. The blade assembly 20 is mounted on a front side of the gear box 111, and the motor 12 and the blade assembly 20 are connected through the transmission assembly. The motor 12 drives the blade assembly 20 to work through a transmission action of the transmission assembly. In this embodiment, by utilizing advantages of the outer rotor motor, a size of the motor is reduced while retaining a required torque. In this embodiment, a weight of the motor 12 is, for example, set between 250 g and 350 g, in an embodiment the weight of the motor 12 is 250 g.

Please refer to FIG. 1 through FIG. 4. In an embodiment, the blade assembly 20 includes at least one blade. In this embodiment, the blade assembly 20 includes a blade holder 21, a first blade 22 and a second blade 23. The blade holder 21 is fixedly mounted together with the housing 11 by fastening bolts. The first blade 22 and the second blade 23 are mounted on the blade holder 21, and both sides of the first blade 22 and the second blade 23 are provided with a plurality of toothed structures. The first blade 22 and the second blade 23 are arranged parallel to each other, and the tooth structures on both sides of the first blade 22 and the second blade 23 are misaligned. In addition, a plurality of sliding grooves 201 are arranged at intervals on blade faces of the first blade 22 and the second blade 23. Correspondingly, a plurality of bolts 202 are arranged at intervals on the blade holder 21. The bolt 202 passes through the sliding groove 201, under a driving action of the motor 12 and through a transmission action of the transmission assembly, the first blade 22 and the second blade 23 may move back and forth alternately along their length direction under a matching of the bolt 202 and the sliding groove 201, so as to realize a cutting function.

Please refer to FIG. 1 through FIG. 4. In an embodiment, an outer side of the blade assembly 20 is further covered with a blade assembly protector 24, so that it is covered on the outer side of the blade assembly 20 when not in use, so as to prevent accidental touches by staff from causing danger, thereby improving its safety.

Please refer to FIG. 1 through FIG. 4. In this embodiment, a gear box cover 112 is arranged on one side of the gear box 111. The gear box cover 112 and the gear box 111 are fastened and fixedly connected together by bolts to form a receiving cavity, and the transmission assembly is located in the receiving cavity. A housing 11 is further arranged on an outside of the gear box 111, and the housing 11 and the gear box 111 are fixedly mounted together by the fastening bolts, for example, to form the receiving cavity. The motor 12 is mounted in the receiving cavity, and the output shaft 121 of the motor 12 extends into the receiving cavity to be connected with the transmission assembly. The housing 11 covers the motor 12 to protect the motor 12 and facilitate the disassembly and assembly of the housing 11 so as to facilitate a maintenance of the motor 12. In this embodiment, the gear box 111 and the gear box cover 112 are made of light alloy, which further reduces the weight of the power assembly 10.

Please refer to FIG. 1 through FIG. 4. In this embodiment, one end of the gear box 111 connected with the connecting rod 30 is provided with a connecting part 1111. The connecting part 1111 is a hollow structure, the first end of the connecting rod 30 extends into the connecting part 1111, and the connecting part 1111 and the connecting rod 30 are locked by fastening bolts. At least two opening grooves 1113 are symmetrically formed on the connecting part 1111 along an axis. The opening groove 1113 extends from an end of the connecting part 1111 and in an axial direction of the connecting part 1111 to separate the connecting part 1111 into two parts. Both sides of the opening groove 1113 are provided with threaded connectors 1114, and the threaded connectors 1114 are located at the end of the connecting part 1111. A threaded hole is provided on the threaded connector 1114, and the connecting part 1111 and the connecting rod 30 are locked by fastening bolts screwed into the threaded hole. Specifically, the two sides of the opening groove 1113 are provided with threaded connectors 1114 to connect by the fastening bolts. By tightening the fastening bolts, the connecting part 1111 divided into two parts by the opening groove 1113 shrinks inwardly, so that the connecting part 1111 and the connecting rod 30 are locked together, which means that the power assembly 10 is fixedly connected with the connecting rod 30 through the connecting part 1111, so that the hedge trimmer cannot turn its head, which shortens an overall length requirement of the hedge trimmer, further reduces the weight of the hedge trimmer, and saves more labor when lifting, thereby prolonging a tolerance time of operator's work.

In this embodiment, a limiting bolt 1112 passes through the connecting part 1111 and the connecting rod 30 to limit a rotation and an axial movement of the connecting rod 30. Specifically, on the first end of the connecting rod 30 connected with the connecting part 1111, a first limiting hole 11121 is arranged along a radial direction of the connecting rod 30. And a second limiting hole 11101 is opened on the connecting part 1111 along the radial direction of the connecting part 1111 correspondingly, which is corresponding to the first limiting hole 11121. The limiting bolt 1112 passes through the first limiting hole 11101 on the connecting part 1111 and the second limiting hole 11121 on the connecting rod 30 in sequence to limit the rotation and axial movement of the connecting rod 30. It should be noted that the limiting bolt 1112 may pass through the other side of the connecting rod 30 and the connecting part 1111, or the limiting bolt 1112 may also be arranged on the other side of the connecting part 1111 for limiting.

Please refer to FIG. 1 through FIG. 4. In this embodiment, the transmission assembly includes a pinion 131, a bull gear 132, a first connecting component 133 and a second connecting component 134. The pinion 131 is mounted on the output shaft 121 of the motor 12, and the bull gear 132 is rotatably mounted between the gear box 111 and the gear box cover 112 and is meshed with the pinion 131 for transmission. Specifically, the bull gear 132 is rotatably connected with the gear box 111 and the gear box cover 112 through a rotation shaft 1321. Both sides of the bull gear 132 are provided with first bearings 1322, and the first bearings 1322 are sleeved on the rotation shaft 1321. Correspondingly, inner sides of the gear box 111 and the gear box cover 112 are respectively provided with bearing mounting grooves. The first bearings 1322 on both sides of the bull gear 132 are respectively located in the bearing mounting grooves inside the gear box 111 and the gear box cover 112, so that the bull gear 132 may rotate stably in the gear box 111. A transmission ratio of the transmission assembly is, for example, set between 5 and 15, and in this embodiment, the transmission ratio is 5.2.

Please refer to FIG. 1 through FIG. 4. In this embodiment, both sides of the bull gear 132 are provided with eccentric blocks 1323 respectively, the eccentric blocks 1323 are located on both sides of the bull gear 132 and deviates from a circle center of the bull gear, the eccentric blocks 1323 on both sides are misaligned with each other, and the eccentric block 1323 and the bull gear 132 are integrally structured. It should also be noted that the eccentric blocks 1323 are cylindrical, and orthographic projections of the center of a cross section of the eccentric blocks 1323 on the bull gear 132 are located on a same diameter as the center of the bull gear 132.

Please refer to FIG. 1 through FIG. 4. In this embodiment, protrusion blocks 203 are arranged on ends of the first blade 22 and the second blade 23 close to the power assembly 10. A first end of the first connecting component 133 is rotatably connected with the eccentric block 1323 on one side of the bull gear 132, and a second end of the first connecting component 133 is rotatably connected with the protrusion block 203 of the first blade 22. A first end of the second connecting component 134 is rotatably connected with the eccentric block 1323 on the other side of the bull gear 132, and a second end of the second connecting component 134 is rotatably connected with the protrusion block 203 of the second blade 23, so that it forms a crank train structure. Driven by the motor 12, through a transmission action of the pinion 131 and the bull gear 132, and through a transmission action of the crank train structure formed by the above-mentioned connecting component, the first blade 22 and the second blade 23 perform staggered reciprocating motions along their length direction under a cooperation of the bolt 202 and the sliding groove 201, so as to realize a cutting function. That is to say, in this embodiment, a combination of the outer rotor motor, a first-stage gear transmission and a crank train drive is used to reduce a loss of power in a transmission process, which ensures a cutting performance and prolongs a duration life. It should also be noted that second bearings 1324 are arranged between the first connecting component 133 and the eccentric block 1323 on one side of the bull gear 132, and between the second connecting component 134 and the eccentric block 1323 on the other side of the bull gear 132, so as to ensure smooth and stable rotations between the first connecting component 133 and the eccentric block 1323, and between the second connecting component 134 and the eccentric block 1323.

Please refer to FIG. 1 through FIG. 4. It should also be noted that limiting components 1325 are arranged on outer sides of the first connecting component 133 and the second connecting component 134. The limiting components 1325 of the first connecting component 133 and the second connecting component 134 are fixedly connected with the gear box 111 and the gear box cover 112 respectively, and are in contact with outer surfaces of the first connecting component 133 and the second connecting component 134 to prevent the first connecting component 133 and the second connecting component 134 from falling between the bull gear 132 and the blade assembly 20, thereby ensuring a stable and reliable transmission thereof.

Please refer to FIG. 1 through FIG. 4. A mounting method of the power assembly 10 is that the first bearing 1322 is pressed and mounted in the corresponding bearing mounting groove of the gear box 111 and the gear box cover 112, the pinion 131 is pressed and mounted on the motor 12, and the motor 12 with the pinion 131 is mounted on a corresponding position of the gear box 111 and fixed with screws. The first connecting component 133 and the second connecting component 134 are assembled respectively on the eccentric blocks 1323 on both sides of the bull gear 132. The rotation shaft 1321 of the bull gear 132 on which the first connecting component 133 and the second connecting component 134 are mounted is mounted in the first bearing 1322 to be connected with the gear box 111. The first blade 22 and the second blade 23 are respectively mounted on corresponding positions of the first end of the first connecting component 133 and the second connecting component 134, the first blade 22 and the second blade 23 are connected with the blade holder 21 respectively, and the blade holder 21 is connected with gear box 111 through bolts. Then the gear box 111 is matched and connected with the gear box cover 112 pressing with the first bearing 1322 by screws, and the rotation shaft 1321 of this bull gear 132 is mounted in the first bearing 1322 on the gear box cover 112. Finally, the housing 11 is mounted on a corresponding position of the gear box 111 and fastened with screws, an assembly of the power assembly 10 is completed, and then the power assembly 10 is directly mounted on the connecting rod 30 and locked with screws.

Please refer to FIG. 1 through FIG. 5. In this embodiment, a battery pack cavity 401 is arranged on the second end of the connecting rod 30 away from the power assembly 10. Specifically, a casing 41 is mounted on the second end of the connecting rod 30 away from the power assembly 10, and the battery pack cavity 401 is arranged in the casing 41. In this embodiment, the battery pack includes at least 23 battery cells. A control panel is mounted in the casing 41, the casing 41 includes a first casing 411 and a second casing 412, and the first casing 411 and the second casing 412 are fixedly connected together. And a bottom of the battery pack cavity 401 is provided with an inserting piece 402, which is electrically connected with the control panel, a battery pack is mounted in the battery pack cavity 401, and the battery pack is connected with the inserting piece 402 to be electrically connected with the control panel. It should also be noted that a battery pack cavity cover (not shown in the figure) is arranged on a top of the battery pack cavity 401, the battery pack cavity cover is connected with the casing 41, and is covered above the battery pack cavity 401, so as to cover the battery pack cavity 401. A voltage of the battery pack in the hedge trimmer is set between 35V and 85V, for example, and a current is set between 0.5A and 3A, for example. In this embodiment, the voltage is 82V, the current is 0.7A, and the voltage of each battery cell is 3.6V. By reducing the number of cells in the battery pack, the weight of the hedge trimmer may be further reduced.

Figure 6:
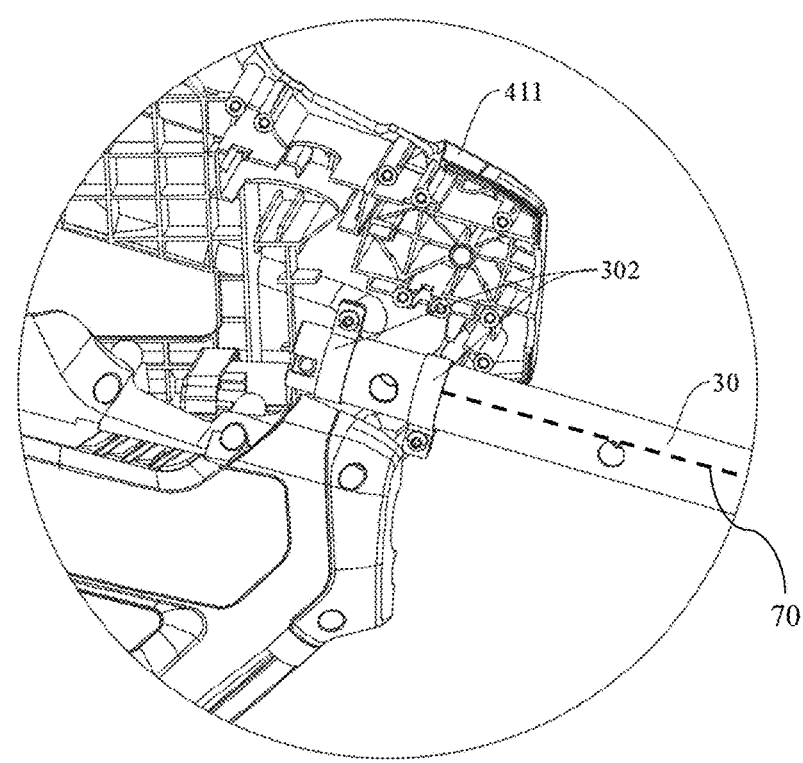
FIG. 6 is a partial exploded view of the battery pack cavity and a connecting rod in an embodiment of the disclosure.

Please refer to FIG. 6. In this embodiment, the second end of the connecting rod 30 fixedly connected with the casing 41 is provided with a fixing component 302. The fixing component 302 is sleeved on the connecting rod 30, the fixing component 302 is fixedly connected with the connecting rod 30, and the fixing component 302 is fastened together with an inner side of the casing 41 through a fastening bolt. In this embodiment, the second end of the connecting rod 30 fixedly connected with the casing 41 is provided with two fixing components 302, one of the fixing components 302 is fixedly connected with the first casing 411 through fastening bolts, and the other fixing component 302 is fixedly connected with the second casing 412 through fastening bolts. In other embodiments, the fixing components 302 may also be integrally formed with the connecting rod.

Please refer to FIG. 1 through FIG. 5. In this embodiment, a bottom of the battery pack cavity 401 is further provided with a battery pack elastic structure 403, and one side of the top of the battery pack cavity 401 is provided with a battery pack releasing button 404. When the battery pack is mounted in the battery pack cavity 401, after the battery pack elastic structure 403 is compressed, the battery pack is fixed in the battery pack cavity 401 under a limitation action of the battery pack releasing button 404. When it needs to be released, the battery pack releasing button 404 is pressed to release a limitation effect on the battery pack, so that the battery pack is ejected under an action of the battery pack elastic structure 403, thereby facilitating a replacement of the battery pack. It should also be noted that, in this embodiment, the casing 41 is provided with a plurality of hollow structures 405, and the hollow structures 405 communicate with the battery pack cavity 401 to improve a heat dissipation effect of the battery pack and further reduce the weight of the hedge trimmer.

Please refer to FIG. 1 through FIG. 5. In this embodiment, an auxiliary handle 60 is also mounted at a tail of the casing 41, specifically, the auxiliary handle 60 is fixedly mounted on a top of the casing 41 away from the power assembly 10, so that the operator may handle it by hand.

Please refer to FIG. 1 through FIG. 5. In this embodiment, the connecting rod 30 is a hollow structure with a power cord 70 inside. The power cord 70 passes through the connecting rod 30 to be electrically connected with the motor 12 so as to provide a power source for the power assembly 10.

Please refer to FIG. 1 through FIG. 5. In this embodiment, the handle assembly 50 is fixedly mounted on the connecting rod 30 and is located at the second end of the connecting rod 30 close to the battery pack cavity 401. Specifically, the handle assembly 50 includes a handle housing 51, a switch trigger 52 and an anti-self-locking component 53. The handle housing 51 includes a first handle housing 511 and a second handle housing 512, the first handle housing 511 and the second handle housing 512 are fixedly connected together and covered on the connecting rod 30. And a speed adjusting switch structure is mounted in the handle housing 51, and a speed adjusting switch is electrically connected with the control panel in the casing 41. The switch trigger 52 is mounted on a bottom of the handle housing 51 and is used to trigger the switch, thereby turning on the circuit. The anti-self-locking part 53 is mounted on a top of the handle housing 51 and is connected with the switch trigger 51 to improve its safety.

Please refer to FIG. 1 through FIG. 5. In this embodiment, when mounting the handle assembly 50, the first handle housing 511 is mounted at a corresponding position of the connecting rod 30, and the speed adjusting switch is assembled at a corresponding position of the first handle housing 511. At the same time, the anti-self-locking component 53 and the switch trigger 52 are mounted in the corresponding position on the first handle housing 511, and then the second handle housing 512 is assembled on the first handle housing 511 and then fixed with screws, so as to complete an assembly of a holding and starting part.

Please refer to FIG. 1 through FIG. 5. In this embodiment, when mounting the battery pack cavity 401 and the casing 41, the first casing 411 is mounted at a corresponding position of the connecting rod 30, and the battery pack cavity 401 is mounted and fastened at a corresponding position of the first casing 411. Then an inserting piece base is mounted at the bottom of the battery pack cavity 401, and a PCB board is also mounted in a corresponding position on a front side of the first casing 411. After internal parts are mounted, the second casing 412 and the first casing 411 are matched and fixed together. Finally, an upper cover is mounted in a corresponding position and fastened with screws, the auxiliary handle 60 is mounted in a corresponding position of a tail of the casing 41, and an assembly of the hedge trimmer is also completed. The hedge trimmer in this embodiment is provided with a connecting rod under a premise of meeting safety regulations and actual use. The power assembly and the battery pack cavity are mounted at both ends of the connecting rod respectively. The battery pack is mounted in the battery pack cavity, and the connecting rod receives the power cord 70 therein. The power cord 70 is connected with the power assembly, the handle assembly and the battery pack. A starting trigger is placed at a holding position of the handle assembly to facilitate an operation of the hedge trimmer. A rear arrangement of the battery pack reduces the weight of the front power assembly, and the hedge trimmer may not be turned, which shortens the overall length requirement of the hedge trimmer, thus reducing the weight of the hedge trimmer, saves more labor when lifting, and facilitates a use for operators. A compact structure of the hedge trimmer ensures the cutting performance of the hedge trimmer and prolongs the duration time on the premise of reducing the weight of the hedge trimmer.

Please refer to FIG. 1 through FIG. 5. It should also be noted that in this embodiment, the connecting rod 30 is further provided with a hanging holder 301. Distances from a center of gravity of the battery pack and the handle assembly 50 to the hanging holder 301 is between 440 mm and 500 mm. Distances from a center of gravity of the power assembly 10 and the blade assembly 20 to the hanging holder 301 is between 900 mm and 1000 mm, so that the hedge trimmer is basically balanced at the hanging holder 301, which is convenient for the operator to use.

The hedge trimmer of the disclosure reduces a weight of the front power assembly by placing the battery pack behind. At the same time, the power assembly is fixedly connected with the connecting rod through the connecting part and the hedge trimmer cannot be turned, which shortens an overall length requirement of the hedge trimmer, thereby reducing the weight of the hedge trimmer, saving more labor when lifting, and convenient for the operator to use. A structure of the hedge trimmer is compact, which ensures a cutting performance of the hedge trimmer and prolongs the duration life under a premise of reducing the weight of the hedge trimmer.

The above description is only a preferred embodiment of the disclosure and an explanation of the applied technical principles. Those skilled in the art should understand that a scope involved in this disclosure is not limited to a technical solution formed by a specific combination of the above technical characteristics, it should also cover other technical solutions formed by any combination of the above technical characteristics or their equivalent characteristics without departing from the concept of the disclosure, such as a technical solution formed by mutually replacing the characteristics mentioned above with the technical characteristics provided in this disclosure (but not limited to) with similar functions.

Except for the technical characteristics described in the specification, the other technical characteristics are known to those skilled in the art. In order to highlight the innovative characteristics of the disclosure, the rest of the technical characteristics will not be repeated here.

What is claimed is:
1. A hedge trimmer, comprising:
   a blade assembly, comprising at least one blade and a blade holder, a power assembly, comprising a housing, a motor and a transmission assembly the power assembly configured to drive the blade assembly to reciprocate, a battery pack, supporting power for the power assembly, a casing, comprising a battery pack cavity, a battery pack elastic structure and a battery pack releasing button, configured to accommodate the battery pack in the battery pack cavity, a connecting rod, a first end of the connecting rod being fixedly connected with the power assembly and a second end of the connecting rod being connected with the battery pack cavity, a handle assembly, fixedly mounted on the second end of the connecting rod and adjacent to the battery pack, configured to control a start and stop of the power assembly, and an auxiliary handle, connected with an end of the casing away from the handle assembly, wherein the blade holder is fixedly connected with the housing, the at least one blade is mounted on the blade holder, the transmission assembly comprises a bull gear, a pinion, two connecting components, two eccentric blocks and two bearings, the housing is provided with a gear box and a gear box cover, a weight of the power assembly comprises weights of the housing including the gear box and the gear box cover, the motor, and the transmission assembly including the bull gear, the pinion, the two connecting components, the two eccentric blocks and the two bearings, a weight of the hedge trimmer comprises the blade assembly, the power assembly, the battery pack, the casing, the connecting rod, the handle assembly and the auxiliary handle, the power assembly accounts for less than 46% of the weight of the hedge trimmer, the connecting rod is further provided with a hanging holder, a first distance from a center of gravity of the battery pack and the handle assembly to the hanging holder is from 440 mm to 500 mm, a second distance from a center of gravity of the power assembly and the blade assembly to the hanging holder is from 900 mm to 1000 mm, the handle assembly is arranged adjacent to the hanging holder and configured to be held by an operator, a distribution of the weight of power assembly and the first and second distances enables the hedge trimmer to be balanced at a position of the hanging holder and labor-saving during an operation of the operator.

2. The hedge trimmer according to claim 1, wherein the motor is mounted in the housing, the motor is an outer rotor motor, and the motor is connected in transmission with the transmission assembly.

3. The hedge trimmer according to claim 2, wherein the pinion is fixed to an output shaft of the outer rotor motor, the bull gear meshes with the pinion, the two eccentric blocks are respectively arranged on positions deviated from a circle center on both sides of the bull gear, a first end of each connecting component is rotatably connected with each eccentric block, a second end of each connecting component is rotatably connected with the blade assembly, and orthographic projections of a center of a cross section of the two eccentric blocks on the bull gear are located on a same diameter as a center of the bull gear, such that the orthographic projection of a center of a cross section of a first of the two eccentric blocks on the bull gear, the orthographic projection of a center of a cross section of a second of the two eccentric blocks on the bull gear, and the center of the bull gear are located on the same diameter.

4. The hedge trimmer according to claim 2, wherein the transmission assembly is arranged in the gear box, and the gear box is fixedly connected with the first end of the connecting rod.

5. The hedge trimmer according to claim 4, wherein an end of the gear box connected with the connecting rod is provided with a connecting part, the connecting part is a hollow structure and the first end of the connecting rod extends into the connecting part, and a rotation and axial movement of the connecting rod are limited by a limiting bolt passing through the connecting part and the connecting rod in sequence.

6. The hedge trimmer according to claim 5, wherein at least two opening grooves are symmetrically opened on the connecting part along an axial direction of the connecting part, both sides of each opening groove are provided with threaded connectors, the threaded connector is located at an end of the connecting part, a threaded hole is arranged on the threaded connector, and a fastening bolt is threaded into the threaded hole to lock the connecting part and the connecting rod.

7. The hedge trimmer according to claim 6, wherein each opening groove extends from an end of the connecting part and in an axial direction of the connecting part to separate the connecting part into two parts.

8. The hedge trimmer according to claim 7, wherein the threaded connectors are configured to enable the connecting part divided into two parts by the opening groove to shrink inwardly, and prevent the hedge trimmer from turning a head thereof.

9. The hedge trimmer according to claim 1, wherein the battery pack cavity is arranged in the casing, and the second end of the connecting rod extends into the casing and is fixedly connected with the casing through a fixing component and a bolt.

10. The hedge trimmer according to claim 9, wherein the casing comprises a first casing and a second casing, the first casing and the second casing are fixedly connected together, the second end of the connecting rod fixedly connected with the casing is provided with two fixing components, a first of the two fixing components is fixedly connected with the first casing through fastening bolts, and a second of the two fixing components is fixedly connected with the second casing through fastening bolts.

11. The hedge trimmer according to claim 1, wherein the connecting rod is a hollow structure, and a power cord is arranged inside the connecting rod.

* * * * *